(12) United States Patent
Kondou

(10) Patent No.: US 9,304,370 B2
(45) Date of Patent: Apr. 5, 2016

(54) OPTICAL WAVEGUIDE DEVICE

(71) Applicant: SUMITOMO OSAKA CEMENT CO., LTD., Chiyoda-Ku, Tokyo (JP)

(72) Inventor: Katsutoshi Kondou, Tokyo (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 14/420,110

(22) PCT Filed: Aug. 8, 2013

(86) PCT No.: PCT/JP2013/071469
§ 371 (c)(1),
(2) Date: Feb. 6, 2015

(87) PCT Pub. No.: WO2014/024957
PCT Pub. Date: Feb. 13, 2014

(65) Prior Publication Data
US 2015/0205181 A1    Jul. 23, 2015

(30) Foreign Application Priority Data

Aug. 9, 2012 (JP) ................................. 2012-176628

(51) Int. Cl.
*G02F 1/01* (2006.01)
*G02F 1/225* (2006.01)
(Continued)

(52) U.S. Cl.
CPC ................ *G02F 1/225* (2013.01); *G02B 6/125* (2013.01); *G02F 1/035* (2013.01); *G02F 2001/212* (2013.01); *G02F 2202/20* (2013.01)

(58) Field of Classification Search
CPC ................ G02F 1/225; G02B 6/125

USPC ......................................... 385/3, 45
See application file for complete search history.

(56) References Cited

U.S. PATENT DOCUMENTS 7,035,485 B2    4/2006   Kondo et al.
7,310,453 B2   12/2007   Ichikawa et al.
(Continued)

FOREIGN PATENT DOCUMENTS

JP    H05-241032 A    9/1993
JP    2000-131544 A   5/2000
(Continued)

OTHER PUBLICATIONS

Kelvin Prosyk et al., "Tunable InP-based Optical IQ Modulator for 160 Gb/s", ECOC Postdeadline Papers, Th. 13.A.5 (2011).
(Continued)

*Primary Examiner* — Sung Pak
(74) *Attorney, Agent, or Firm* — Taft Stettinius & Hollister LLP

(57) ABSTRACT

An optical waveguide device in which optical characteristics are less degraded even when a branch angle in a Y branch portion of an optical waveguide is great is provided.
In an optical waveguide device in which an optical waveguide is formed on a substrate, the optical waveguide includes a first branch portion which branches light into two light rays at a branch angle of $\frac{1}{35}$ rad or more, a second branch portion (not illustrated) and a third branch portion (not illustrated) are arranged to be connected to each of two branched waveguides branched from the first branch portion, a radiation light guiding waveguide is arranged between the two branched waveguides of the first branch portion, and guides radiation light radiated from between the two branched waveguides at the first branch portion to the outside of the optical waveguide, and an optical termination portion (an electrode) which absorbs the guided radiation light or emits the guided radiation light to the outside of the substrate is arranged in a termination portion of the radiation light guiding waveguide.

17 Claims, 5 Drawing Sheets

(51) Int. Cl.
*G02B 6/125* (2006.01)
*G02F 1/035* (2006.01)
*G02F 1/21* (2006.01)

(56) References Cited

U.S. PATENT DOCUMENTS

| | | | |
|---|---|---|---|
| 7,362,924 | B2 | 4/2008 | Ichioka et al. |
| 7,787,717 | B2 * | 8/2010 | Ohmori .................. G02B 6/125 385/14 |
| 2006/0110089 | A1 * | 5/2006 | Ichikawa ............... G02F 1/0311 385/3 |
| 2007/0053625 | A1 * | 3/2007 | Ichioka ................ G02F 1/0311 385/2 |
| 2008/0199136 | A1 * | 8/2008 | Nakane .................. G02B 6/125 385/126 |
| 2011/0103735 | A1 | 5/2011 | Oikawa et al. |
| 2011/0110629 | A1 * | 5/2011 | Nagano .............. G02B 6/12007 385/48 |
| 2012/0207425 | A1 | 8/2012 | Kondou |
| 2013/0195400 | A1 | 8/2013 | Miyazaki et al. |
| 2015/0277156 | A1 * | 10/2015 | Kondou ................ G02F 1/2255 385/2 |

FOREIGN PATENT DOCUMENTS

| | | |
|---|---|---|
| JP | 3184426 B | 4/2001 |
| JP | 2003-215519 A | 7/2003 |
| JP | 2004-046021 A | 2/2004 |
| JP | 2004-093905 A | 3/2004 |
| JP | 2005-141156 A | 6/2005 |
| JP | 2006-276518 A | 10/2006 |
| JP | 2009-053444 A | 3/2009 |
| JP | 2009-244811 A | 10/2009 |
| JP | 4658658 B | 1/2011 |
| JP | 2011-075906 A | 4/2011 |
| JP | 2012-078508 A | 4/2012 |

OTHER PUBLICATIONS

Jungo Kondo et al., "High-Speed and Low-Driving-Voltage Thin-Sheet X-Cut LiBn03 Modulator with Laminated Low-Dielectric-Constant Adhesive", IEEE Photonics Technology Letters, vol. 17, No. 10, pp. 2077-2079, Oct. 2005.

Tetsuro Yabu et al., "Low-Loss Wide-Angle Y-Branch Optical Waveguides", The institute of Electronics, INformation and Communication Engineers C, vol. J87-C, No. 8, pp. 609-615, Aug. 2004.

Makoto Minakata et al., "LiNbO3 Optical Waveguide Devices", The Institute of Electronics, Information and Communication Engineers C-I vol. J77-C-I, No. 5, pp. 194-205, May 1994.

* cited by examiner

OPTICAL WAVEGUIDE DEVICE

TECHNICAL FIELD

The present invention relates to an optical waveguide device, and in particular, relates to an optical waveguide device in which optical characteristics are improved even when a branch angle in a Y branch of an optical waveguide is great.

BACKGROUND ART

In optical communication or optical information processing, an optical waveguide device is used in which an optical waveguide is formed on a substrate having electro-optic effect as lithium niobate (LN) or the like.

In an LN modulator which is an example of the optical waveguide device, a shape of a waveguide is in a Mach-Zehnder (MZ) structure. A modulator having a MZ structure controls on/off of light by an applied voltage which is applied to a control electrode arranged along a branched optical waveguide of a MZ structure. Specifically, when an output waveguide of the waveguide having a MZ structure is a single mode waveguide, on/off of the light is able to be performed by fundamental mode and excited mode control due to a change in a propagation speed of the light according to the applied voltage.

Properties of the LN modulator include $V\pi$ and an optical bandwidth. $V\pi$ is an applied voltage necessary for turning the light off-state from on-state, and the optical bandwidth is a frequency at which an on/off operation is able to be performed. As to properties of the LN modulator, it is preferable that $V\pi$ is small and the optical bandwidth is wide.

In general, when a voltage is applied to a capacitor parallel circuit, a large electric field is applied to a capacitor side having large dielectric constant. As disclosed in Patent Literature No. 1, when a thickness of the substrate of the LN modulator becomes thin to the extent of a light distribution, a microwave electric field efficiently overlap the optical waveguide, and thus it is possible to drive the LN modulator at low $V\pi$.

However, when the substrate is thin, the optical characteristics are easily degraded (unstable) compared to an optical modulator including a thick substrate. One of the reasons is light leakage propagating inside the substrate except for the optical waveguide. For this reason, a countermeasure against the light leakage is necessary for the thinned LN modulator as disclosed in Patent Literature No. 2.

Recently, a method of modulating a phase such as a tetravalent phase modulation (Phase Shift Keying, PSK) type optical modulator (4 level PSK modulator) has been mainly used. In order to modulate the phase, it is necessary that a plurality of the optical waveguides having a MZ structure is arranged. For example, when the tetravalent PSK modulator is used, three MZ structures are necessary, and when a polarization multiplexing tetravalent PSK modulator is used, six MZ structures are necessary.

Specifically, as illustrated in FIG. 1, in the tetravalent PSK modulator, it is necessary that input light is branched into four light rays. In FIG. 1, a nest type waveguide is used in which two small MZ structures (sub MZ) are arranged in branched waveguides of one large MZ structure (a main MZ). Each separated waveguide is subjected to phase modulation in its interacting portion. A coplanar waveguide structure is applied to an electrode for modulation corresponding to each MZ structure.

When considering crosstalk of electrical signal among MZ structures and a GND function, it is necessary that a GND (ground) electrode width between MZ structures of the tetravalent PSK modulator corresponding to the closest distance between the sub MZ structures of FIG. 1 is at least 200 μm. For this reason, a separation gap (a Y branch gap) of an incident Y branch of light four-branched portion is 200 μM or more.

In Non Patent Literature No. 1, although a tetravalent PSK modulator using InP which is able to be more downsized than the LN modulator is used, the Y branch gap of 350 μm is ensured in consideration of the crosstalk of the electrical signal and the GND function.

In addition, a wide angle Y branch in which a branch angle of a Y branch is great is considered even in integration of an optical circuit. An object of Non Patent Literature No. 2 or Patent Literature No. 3 is to reduce a loss in the Y branch portion, and all influences of the light leaked from the Y branch portion are not considered.

On the other hand, a processing method of the light leaked from the optical waveguide is disclosed in Patent Literature No. 4 or 5, and in particular, a technology relevant to light leakage from a curved portion or a Y-shaped multiplexing portion of the optical waveguide is disclosed. In addition, the optical waveguide in which light leakage occurs from an S-shaped portion has wavelength dependency, and thus is not able to be typically used as an optical device in a communication field.

As described above, in the optical waveguide device such as the tetravalent PSK modulator, the separation gap of the incident Y branch of the light four-branched portion is wide, but a length of the Y branch is limited by a constraint of a size of the optical waveguide device, and thus a Y branch angle is greater than normal. As a result thereof, the light is leaked from the Y branch portion, and thus the optical characteristics of the optical modulator or the like are degraded. Further, when a thinning structure is used in which the substrate is thinned, as described above, the optical characteristics are remarkably degraded.

CITATION LIST

Patent Literature

[Patent Literature No. 1] Japanese Laid-open Patent Publication No. 2003-215519
[Patent Literature No. 2] Japanese Patent No. 4658658
[Patent Literature No. 3] Japanese Laid-open Patent Publication No. 2000-131544
[Patent Literature No. 4] Japanese Laid-open Patent Publication No. 2004-46021
[Patent Literature No. 5] Japanese Patent No. 3184426

Non Patent Literature

[Non Patent Literature No. 1] Kelvin Prosyk et al., "Tunable InP-based Optical IQ Modulator for 160 Gb/s", ECOC Postdeadline Papers, Th.13.A.5 (2011)
[Non Patent Literature No. 2] YABU Tetsuro et al., "Low Loss Wide Angle Y Branch Optical Waveguides", The Institute of Electronics, Information and Communication Engineers C, Vol. J87-C, No. 8, pp 609-615, August 2004
[Non Patent Literature No. 3] MINAKATA Makoto, "LINbO3 Optical Waveguide Devices", The Institute of Electronics, Information and Communication Engineers C-I, Vol. J77-C-I, No. 5, pp 194-205, May 1994

[Non Patent Literature No. 4] Jungo Kondo et al., "High-Speed and Low-Driving-Voltage Thin-Sheet X-Cut LiNbO3 Modulator With Laminated Low-Dielectric-Constant Adhesive", IEEE Photonics Technology Letters, Vol. 17, No. 10, pp 2077-2079, October 2005

SUMMARY OF INVENTION

Technical Problem

An object of the present invention is to solve the problems described above, and is to provide an optical waveguide device in which optical characteristics are less degraded even when a branch angle in a Y branch portion of an optical waveguide is great.

Solution to Problem

In order to solve the problems described above, an optical waveguide device of the present invention has the following technical features.

(1) In an optical waveguide device in which an optical waveguide is formed on a substrate, the optical waveguide includes a first branch portion which branches light into two light rays at a branch angle of 1/35 rad or more, a second branch portion and a third branch portion are arranged to be connected to each of two branched waveguides branched from the first branch portion, a radiation light guiding waveguide is arranged between the two branched waveguides of the first branch portion, and guides radiation light radiated from between the two branched waveguides at the first branch portion to the outside of the optical waveguide, and an optical termination portion which absorbs the guided radiation light or emits the guided radiation light to the outside of the substrate is arranged in a termination portion of the radiation light guiding waveguide.

(2) In the optical waveguide device according to (1), the optical termination portion is a conductive member arranged on the substrate.

(3) In the optical waveguide device according to (2), the conductive member is a part of an electrode for modulating light propagating the optical waveguide.

(4) In the optical waveguide device according to (1), the optical termination portion is a groove having a width of 80 μM or more in a main propagation direction of the radiation light.

(5) In the optical waveguide device according to any one of (1) to (4), each of the second branch portion and the third branch portion is a part of a Mach-Zehnder type optical waveguide, and the closest distance between the Mach-Zehnder type optical waveguides is 200 μm or more.

(6) In the optical waveguide device according to any one of (1) to (5), the substrate is configured of lithium niobate or lithium tantalate with a thickness of 20 μm or less.

Advantageous Effects of Invention

According to the optical waveguide device of the present invention, in the optical waveguide device in which the optical waveguide is formed on the substrate, the optical waveguide includes the first branch portion which branches the light into two light rays at the branch angle of 1/35 rad or more, the second branch portion and the third branch portion are arranged to be connected to each of two branched waveguides branched from the first branch portion, the radiation light guiding waveguide is arranged between the two branched waveguides of the first branch portion, and guides the radiation light radiated from between the two branched waveguides at the first branch portion to the outside of the optical waveguide, and the optical termination portion which absorbs the guided radiation light or emits the guided radiation light to the outside of the substrate is arranged in the termination portion of the radiation light guiding waveguide, and thus it is possible to reliably reduce light leakage from the first branch portion (an incident Y branch portion, and a Y branch portion on an incident side of a main MZ) from being incident on a MZ waveguide (a sub MZ) formed in the branched waveguide, and it is possible to prevent optical characteristics of the optical waveguide device from being degraded, such as improvement in an On/Off extinction ratio of a sub MZ structure.

DESCRIPTION OF EMBODIMENTS

Hereinafter, the optical waveguide device of the present invention will be described in detail by using preferred examples.

Figure 2:
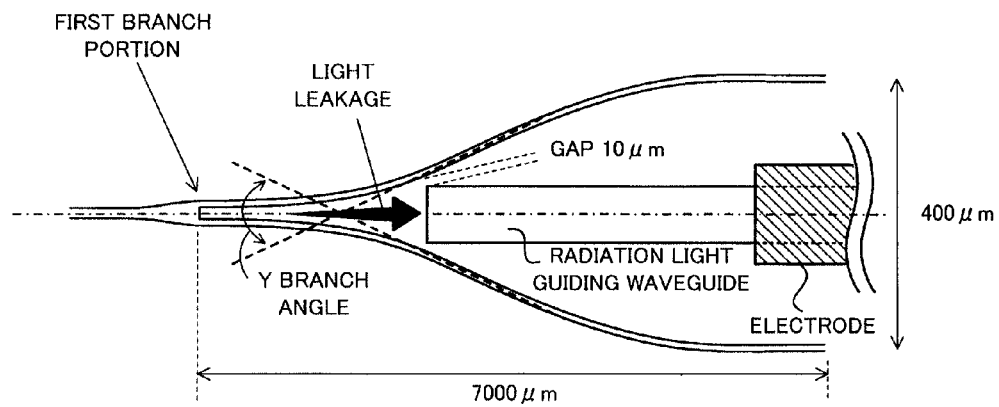
FIG. 2 is a diagram showing a structure in the vicinity of a first branch portion in the optical waveguide device of the present invention.

As illustrated in FIG. 2, the optical waveguide device of the present invention is an optical waveguide device in which an optical waveguide is formed on a substrate, the optical waveguide includes a first branch portion which branches light into two light rays at a branch angle of 1/35 rad or more, a second branch portion and a third branch portion are arranged to be connected to each of two branched waveguides branched from the first branch portion, a radiation light guiding waveguide is arranged between the two branched waveguides of the first branch portion, and guides radiation light radiated from between the two branched waveguides at the first branch portion to the outside of the optical waveguide, and an optical termination portion which absorbs the guided radiation light or emits the guided radiation light to the outside of the substrate is arranged in a termination portion of the radiation light guiding waveguide.

Figure 1:
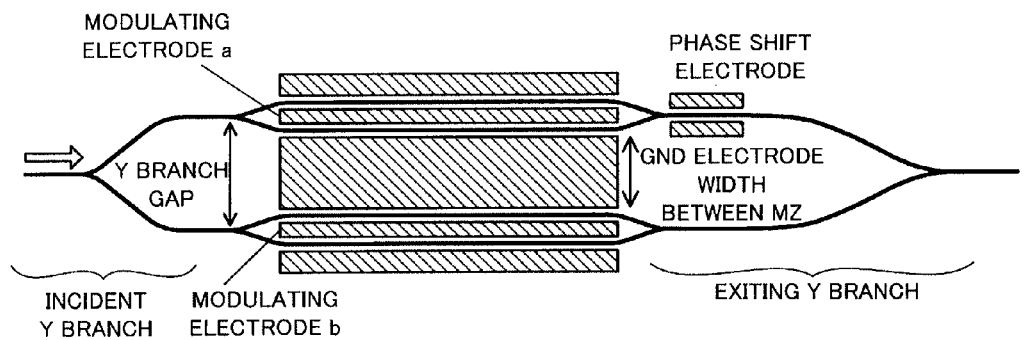
FIG. 1 is a diagram showing an example of an optical waveguide device used in a tetravalent PSK modulator.

FIG. 2 is a diagram illustrating an enlarged incident Y branch of FIG. 1, behind the incident Y branch which is a first branch portion, a Y branch portion (a second and a third branch portions) of a sub MZ structure is connected to each branched waveguide, but this is not illustrated in FIG. 2. As illustrated in FIG. 2, when a Y branch portion having a great branch angle is adopted, light leakage is easily occurs from between the two branched waveguides at the Y branch portion. For this reason, in the present invention, the light leakage is prevented from being diffused in a radiation light guiding waveguide, the light leakage is guided to an optical termination portion, and radiation light is absorbed or emitted to the outside of the substrate. Accordingly, a problem such as a mix of the light leakage to an optical waveguide of the sub MZ structure or the like, degradation of an On/Off extinction ratio of the sub MZ structure, and degradation of optical characteristics of the optical waveguide device is prevented from occurring.

Figure 3:
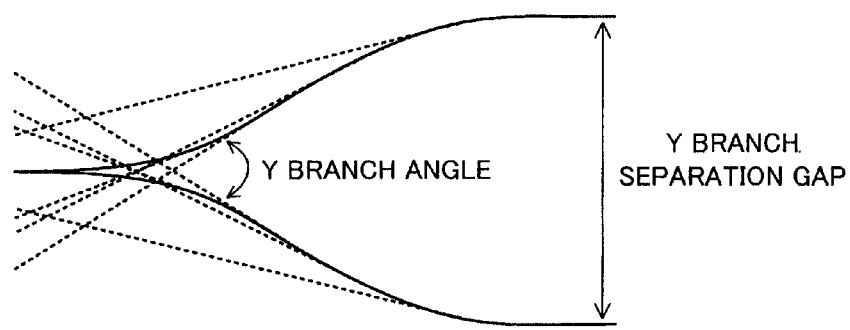
FIG. 3 is a diagram showing a "branch angle".

As illustrated in FIG. 3, the "branch angle (a Y branch angle)" used in the present invention indicates that an angle formed by tangent lines (dotted lines) of curved lines formed by the optical waveguide which is branched by the Y branch is the greatest angle. When a shape of the branched waveguide is different in an upper portion and a lower portion of FIG. 3 (when a shape of the branched waveguide is not line symmetrical), a combination of the tangent lines is selected in which an angle formed by the tangent lines in an upper half portion and a lower portion of this drawing among the tangent lines with respect to the curved lines of each branched waveguide is the greatest, and a value of the angle is a "branch angle".

In addition, the "Y branch separation gap" illustrated in FIG. 3 indicates the greatest distance between two branched waveguides which are separated from each other by the Y branch. In the optical waveguide device of the present invention, when it is assumed that the closest distance between the respective Mach-Zehnder type optical waveguides configuring the sub MZ structures is 200 μm or more, it is necessary that the incident Y branch separation gap is 200 μm or more. When a length of the incident Y branch portion (a length of the two branched waveguides from being branched to being parallel with each other) is 7000 μm, the Y branch angle is approximately 2/35 rad.

Figure 4:
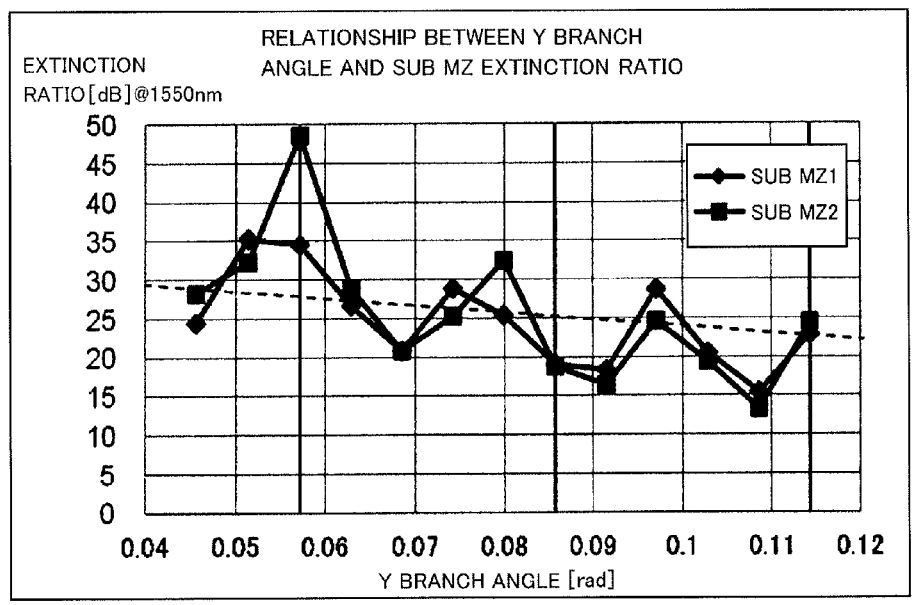
FIG. 4 is a graph comparing optical characteristics (a relationship between a Y branch angle and an extinction ratio of a sub MZ) between the optical waveguide device of the present invention and a product of the related art.

A result in which an extinction ratio of the sub MZ is estimated by using the incident Y branch gap as a parameter when the incident Y branch length is 3500 μm is illustrated in FIG. 4. It is necessary that an extinction ratio of a commercial modulator (for example, a tetravalent PSK modulator) is 25 dB or more, and as read from FIG. 4, the Y branch angle is 1.6/35 rad or more, and the extinction ratio is 25 dB or less, and the Y branch angle is 2.4/35 rad or more and the extinction ratio is 20 dB or less. Thus, it is determined that when the Y branch gap is widened, the extinction ratio of the sub MZ is degraded.

As to the substrate, a substrate having an electro-optic effect, as lithium niobate, lithium tantalate, or the like, is able to be used. In addition, a substrate including an optical waveguide portion to be subjected to optical modulation, and a substrate including other waveguides such as a Y branch portion or a Y multiplexing portion, are able to be configured as a substrate of a different material.

As a forming method of the optical waveguide, for example, a high refractive index substance such as titanium (Ti) is heat diffused on a LiNbO$_3$ substrate (an LN substrate), and thus the optical waveguide is formed. In addition, as a ridge type waveguide, the optical waveguide is able to be formed by forming concavities and convexities on the substrate.

A substrate of lithium niobate or lithium tantalate of which a thickness is 20 μm or less is preferably used in the optical waveguide device of the present invention. For example, an LN wafer in which a Ti diffusion waveguide is formed is used by being ground up to 20 μm or less and by being fixed to a holding substrate through an adhesive agent. As a Ti diffusion step, a known technology disclosed in Non Patent Literature 3 is able to be used, and as a thin modulator forming method, a known technology disclosed in Non Patent Literature 4 is able to be used. Furthermore, thinning of the substrate is able to be performed after forming an electrode.

As to forming an electrode such as an electrode for modulation or an electrode for phase shift, a seed layer is formed by a vapor deposition method, a sputtering method, a CVD method, or the like to have a thickness of 100 nm, and afterward electrolytic plating and a semi-additive method. When a conductive member (a film body) is used as the optical termination portion of the present invention, the conductive member may be arranged concurrently with the forming of the electrode, and the conductive member is able to be arranged in a separate manufacturing process. In addition, as the optical termination portion, a part of a ground electrode configuring the electrode is able to have a function thereof.

In the optical waveguide device of the present invention, the Y branch angle in the first branch portion is great, and thus a wavefront of a light wave and a waveguide propagation direction are not coincident with each other. As a result thereof, a component of the light wave which is not coincident is leaked to a center portion of the Y branch, and thus affects the sub MZ structure. In particular, when the substrate is a thin substrate, the light leakage is confined in a substrate of a thin substrate structure, in particular, to a vertical direction of the substrate. For this reason, the light leakage is widened only in a horizontal direction, and the Y branch portion (the optical waveguide) of the sub MZ structure is easily mixed. Accordingly, a branching ratio of the Y branch portion in the sub MZ is degraded, and the On/Off extinction ratio is degraded.

In order to guide the light leakage from the first branch portion not to be diffused, a waveguide (a radiation light guiding waveguide) having a wide width is formed between the two branched waveguides at the Y branch portion, and thus the light is confined. The radiation light guiding waveguide is optically coupled with the branched waveguide, and an excessive optical loss is able to occur, and thus as illustrated in FIG. 2, the shortest distance between the radiation light guiding waveguide and the branched waveguide is set to be 10 μM or more. This is approximately a size (a 1/e$^2$ value) of a light distribution of the branched waveguide.

In order to guide the light leakage to the radiation light guiding waveguide, (1) a propagation direction is a light leakage direction (in case of a symmetric Y branch, a direction of a symmetric axis), (2) a differential of the waveguide width with respect to the propagation direction is smaller than the Y branch angle, and (3) a start width of a radiation light guiding waveguide width is as wider as possible are essential requisites. In FIG. 2, a linear slab waveguide is set as the radiation light guiding waveguide. The radiation light guiding waveguide is able to be formed concurrently with the optical waveguide having the MZ structure. In addition, as necessary, the radiation light guiding waveguide is able to be formed in a step separated from a usual step of forming the optical waveguide.

In the present invention, in order to terminate the light propagating through the radiation light guiding waveguide, the optical termination portion is disposed on a center side of a main MZ structure. In FIG. 2, as the optical termination portion, the ground electrode (the GND electrode) is used, and the light leakage is guided to the electrode by the radiation light guiding waveguide. The light wave passing through a thin LN plate in a lower portion of the GND electrode is absorbed and attenuated by metal in an upper portion (the GND electrode). Thus, the GND electrode also has an optical termination function.

The LN modulator of the related art does not absorb the light by a buffer layer (BF) formed between the substrate and the electrode, but when a thickness of the buffer layer is 0.2 µm or less, a light absorption function is exhibited. As a result thereof, the buffer layer of 0.2 µm or less is able to be inserted, and also it is possible to improve properties only by a change in photomasks for the optical waveguide and the electrode.

Figure 5:
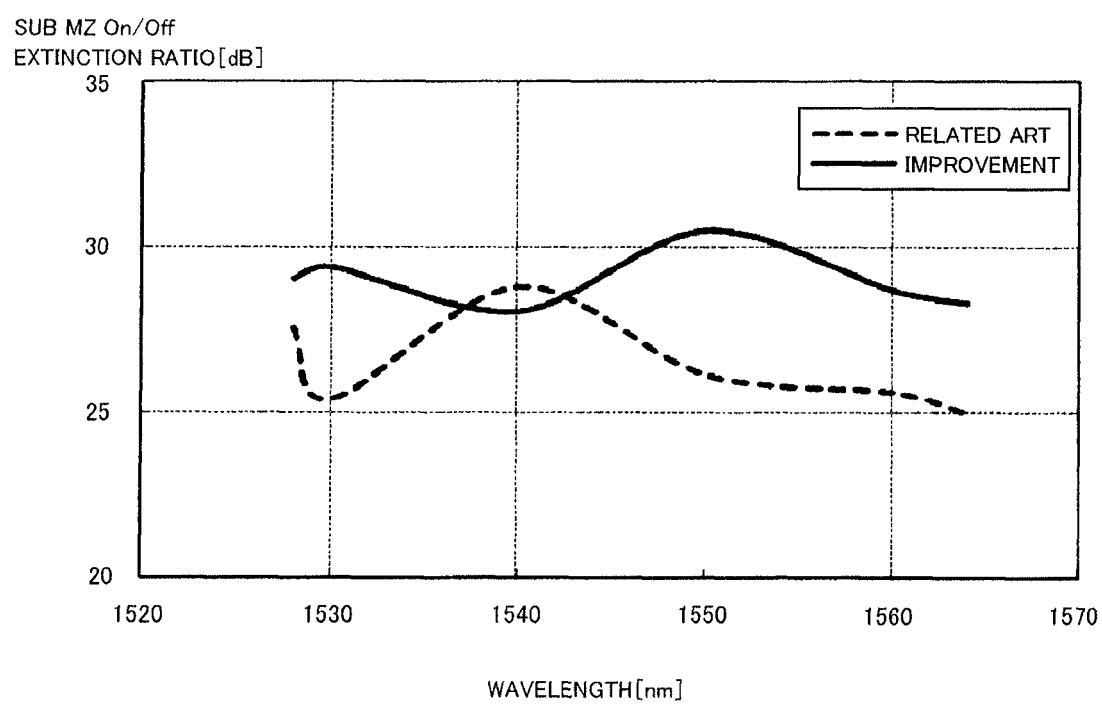
FIG. 5 is a graph comparing optical characteristics (a relationship between a light wavelength to be used and the extinction ratio of the sub MZ) between the optical waveguide device of the present invention and the product of the related art.

FIG. 5 is a graph comparing properties between the optical waveguide device having a structure illustrated in FIG. 2 and the optical waveguide device of the related art. It is easily understood that in the optical waveguide device of the present invention, the On/Off extinction ratio in the sub MZ structure is improved over a whole measured wavelength region.

Figure 6A:
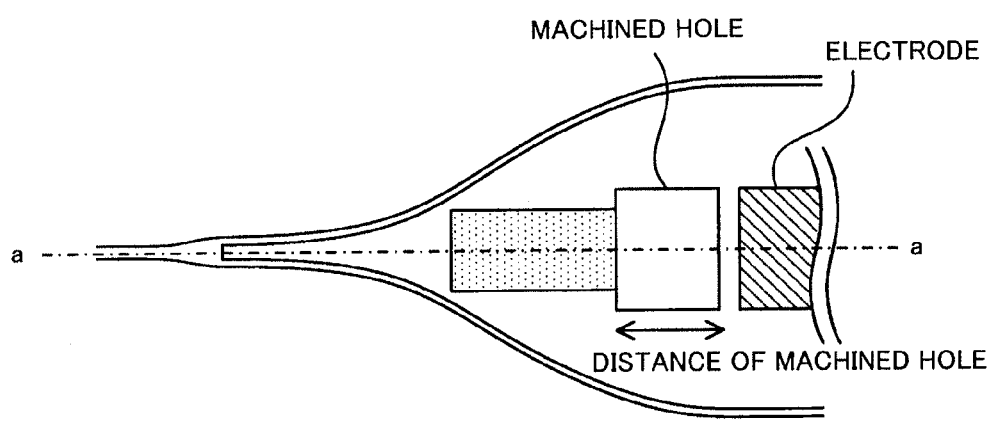
FIG. 6 is a diagram showing an example in which an optical termination portion using a groove is used in the optical waveguide device of the present invention.
Figure 6B:
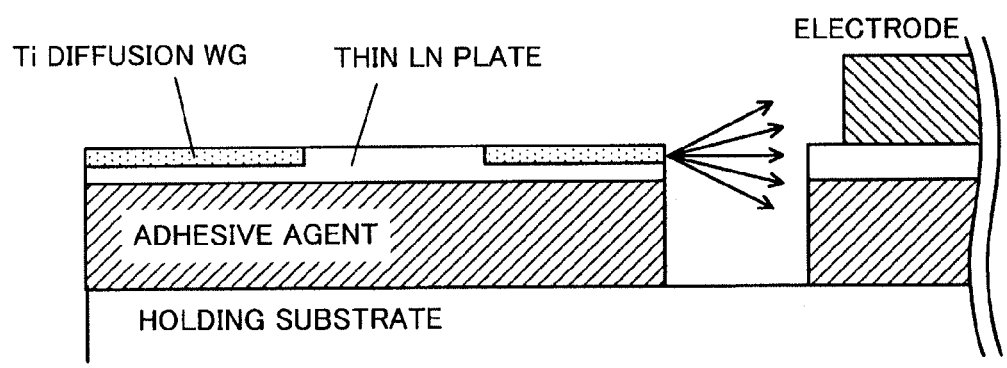

As the optical termination portion used in the optical waveguide device of the present invention, as illustrated in FIG. 6, a groove (including not only an indentation of the substrate but also a hole passing through the substrate) is able to be formed in a part of the substrate instead of the optical termination portion illustrated in FIG. 2. FIG. 6($b$) is a cross-sectional view cut along dashed-dotted line a-a of FIG. 6($a$).

The groove is able to be formed by using dry etching, an excimer laser, or the like. By this groove, the light propagating through the radiation light guiding waveguide is radiated to a space, and thus an optical termination function is realized. According to a size of a width of the groove (a length in the propagation direction of the radiation light), the radiated light is incident on an inner portion of the thin substrate again. When considering the radiated light by using beam divergence angle ($\theta$ to $\lambda/D$), in order to set an amount of re-incidence light to the thin substrate to be ⅕ or less, it is preferable that the width of the groove (the length in the horizontal direction of the drawing) is set to be approximately 80 µm or more. In practice, machined hole of a length of 200 µm is performed by using the excimer laser in the middle of the radiation light guiding waveguide. As a result thereof, it is confirmed that the On/Off extinction ratio of the sub MZ structure is improved.

Figure 7A:
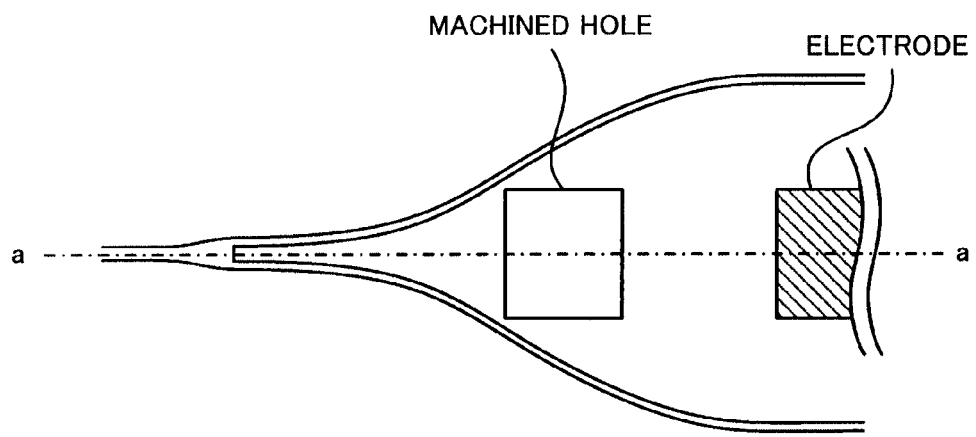
FIG. 7 is a diagram showing an example of the optical waveguide device which is experimentally prepared for confirming an effect only of the groove.
Figure 7B:
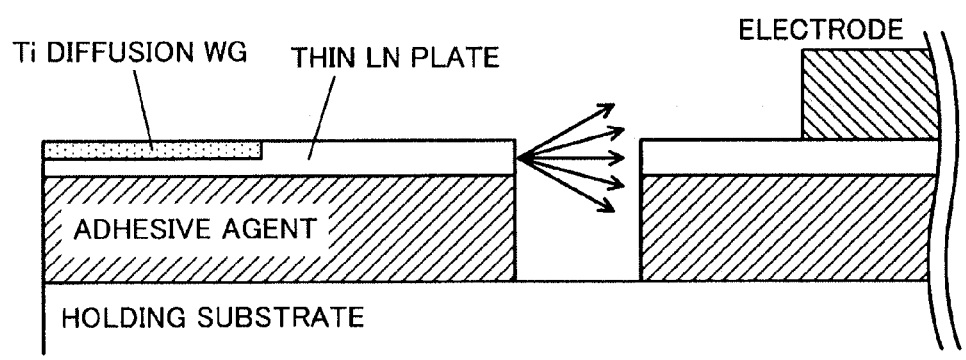

Further, as illustrated in FIG. 7, machined hole of 80 µm is performed in a start position of the radiation light guiding waveguide. As a result thereof, some optical characteristics are improved, but in contrast, properties may be degraded due to an influence such as scattering of the light wave in a side surface in which a hole is formed, and a variation in the properties between devices is greater than that of a configuration of FIG. 5. Accordingly, it is understood that a combination of the radiation light guiding waveguide and the optical termination portion greatly contributes to improvement in optical characteristics.

INDUSTRIAL APPLICABILITY

As described above, according to the present invention, even when the branch angle in the Y branch portion of the optical waveguide is great, it is possible to provide the optical waveguide device in which optical characteristics are less degraded.

The invention claimed is:

1. An optical waveguide device comprising an optical waveguide formed on a substrate, wherein
the optical waveguide comprises a first branch portion which branches light into two light rays at a branch angle of ⅟35 rad or more,
a second branch portion and a third branch portion are arranged to be connected to each of two branched waveguides branched from the first branch portion,
a radiation light guiding waveguide is arranged between the two branched waveguides of the first branch portion, and guides radiation light radiated from between the two branched waveguides at the first branch portion to the outside of the optical waveguide, and
an optical termination portion which absorbs the guided radiation light or emits the guided radiation light to the outside of the substrate is arranged in a termination portion of the radiation light guiding waveguide.

2. The optical waveguide device according to claim 1, wherein the optical termination portion is a conductive member arranged on the substrate.

3. The optical waveguide device according to claim 2, wherein the conductive member is a part of an electrode for modulating light propagating through the optical waveguide.

4. The optical waveguide device according to claim 1, wherein the optical termination portion is a groove having a width of 80 µm or more in a main propagation direction of the radiation light.

5. The optical waveguide device according to claim 1, wherein each of the second branch portion and the third branch portion is a part of a Mach-Zehnder type optical waveguide, and the closest distance between the Mach-Zehnder type optical waveguides is 200 µm or more.

6. The optical waveguide device according to claim 1, wherein the substrate is comprised of lithium niobate or lithium tantalate and has a thickness of 20 µm or less.

7. The optical waveguide device according to claim 2, wherein each of the second branch portion and the third branch portion is a part of a Mach-Zehnder type optical waveguide, and the closest distance between the Mach-Zehnder type optical waveguides is 200 µm or more.

8. The optical waveguide device according to claim 3, wherein each of the second branch portion and the third branch portion is a part of a Mach-Zehnder type optical waveguide, and the closest distance between the Mach-Zehnder type optical waveguides is 200 µm or more.

9. The optical waveguide device according to claim 4, wherein each of the second branch portion and the third branch portion is a part of a Mach-Zehnder type optical waveguide, and the closest distance between the Mach-Zehnder type optical waveguides is 200 µm or more.

10. The optical waveguide device according to claim 2, wherein the substrate is comprised of lithium niobate or lithium tantalate and has a thickness of 20 µm or less.

11. The optical waveguide device according to claim 3, wherein the substrate is comprised of lithium niobate or lithium tantalate and has a thickness of 20 µm or less.

12. The optical waveguide device according to claim 4, wherein the substrate is comprised of lithium niobate or lithium tantalate and has a thickness of 20 µm or less.

13. The optical waveguide device according to claim 5, wherein the substrate is comprised of lithium niobate or lithium tantalate and has a thickness of 20 µm or less.

14. The optical waveguide device according to claim 6, wherein the substrate is comprised of lithium niobate or lithium tantalate and has a thickness of 20 µm or less.

15. The optical waveguide device according to claim 7, wherein the substrate is comprised of lithium niobate or lithium tantalate and has a thickness of 20 µm or less.

16. The optical waveguide device according to claim 8, wherein the substrate is comprised of lithium niobate or lithium tantalate and has a thickness of 20 µm or less.

17. The optical waveguide device according to claim 9, wherein the substrate is comprised of lithium niobate or lithium tantalate and has a thickness of 20 µm or less.

* * * * *